United States Patent [19]

McGarr

[11] 4,032,516

[45] * June 28, 1977

[54] METHOD OF MAKING POLYURETHANE POWDER

[75] Inventor: John J. McGarr, Beverly, Mass.

[73] Assignee: USM Corporation, Boston, Mass.

[ * ] Notice: The portion of the term of this patent subsequent to Jan. 22, 1991, has been disclaimed.

[22] Filed: July 17, 1975

[21] Appl. No.: 596,816

Related U.S. Application Data

[63] Continuation-in-part of Ser. No. 358,476, May 9, 1973, Pat. No. 3,917,741, which is a continuation-in-part of Ser. No. 263,658, June 16, 1972, Pat. No. 3,817,886, which is a continuation-in-part of Ser. No. 278,611, Aug. 7, 1972, Pat. No. 3,787,525.

[52] U.S. Cl. .................................... 260/77.5 AA
[51] Int. Cl.$^2$ .................................... C08G 18/08
[58] Field of Search .......... 260/858, 859 R, 75 NE, 260/77.5 AA, 77.5 AM, 33.6 UB, 33.8 UB, 33.4 UR, 33.2 R

[56] References Cited

UNITED STATES PATENTS

| | | | |
|---|---|---|---|
| 3,236,812 | 2/1966 | McElroy | 260/30.8 DS |
| 3,312,666 | 4/1967 | Knipp | 264/165 |
| 3,317,635 | 5/1967 | Osmond | 260/859 R |
| 3,382,297 | 5/1968 | Thompson | 260/859 R |
| 3,560,447 | 2/1971 | Bingham | 260/29.2 TN |
| 3,655,627 | 4/1972 | Hutzler | 264/289 |
| 3,787,525 | 1/1974 | McGarr | 260/859 R |
| 3,817,886 | 6/1974 | McGarr | 260/18 TN |
| 3,894,994 | 7/1975 | Day | 260/77.5 AA |
| 3,917,741 | 11/1975 | McGarr | 260/859 R |

FOREIGN PATENTS OR APPLICATIONS

| | | |
|---|---|---|
| 414,155 | 8/1966 | Australia |

*Primary Examiner*—Paul R. Michl
*Attorney, Agent, or Firm*—Benjamin C. Pollard; Richard B. Megley; Vincent A. White

[57] ABSTRACT

Method for preparing polyurethane resin directly in finely divided form in which method a first reactant for forming the polyurethane is emulsified as fine droplets with the aid of special surfactants and controls in an inert organic liquid medium in which it and polyurethane resin are insoluble, a second reactant also insoluble in the liquid is introduced into the liquid medium and interacted with the droplets of the first reactant to form fine particles of solid polyurethane resin protected from agglomeration by the surfactant, and the particles of polyurethane resin are separated from the liquid medium.

9 Claims, No Drawings

METHOD OF MAKING POLYURETHANE POWDER

This application is a continuation-in-part of my eariler copending application U.S. Ser. No. 358,476, filed May 9, 1973, now U.S. Pat. No. 3,917,741 issued Nov. 4, 1975, which application is a continuation-in-part or my earlier copending applications Ser. No. 263,658, filed June 16, 1972 now U.S. Pat. No. 3,817,886, issued June 18, 1974 entitled Manufacture of Particulate Polyurethane Material In An Organic Medium And In the Presence Of a Bentone and Ser. No. 278,611, filed Aug. 7, 1972 now U.S. Pat. 3,787,525 issued Jan. 22, 1974 entitled "Manufacture Of Polyurethane Powders Using Polyvinyl Pyrrolidone Having Side Chains From Copolymerization With Alkylated Olefins."

BACKGROUND OF THE INVENTION

The demand for thermoplastic resin powders is large and steadily growing for such uses as coatings and adhesives, particularly in view of the increasing strictness of regulations regarding discharge of solvent materials into the atmosphere. In general, resin powders have been prepared by processes of grinding already formed resinous material or by dissolving already formed resinous material and precipitating the resinous material from solution. However, by the very fact that the resinous materials to be ground are thermoplastic and often tough materials, relatively costly procedures involving chilling of the resin, for example with liquid nitrogen, have been necessary for effective grinding. In addition to the cost of the refrigerant and of the grinding equipment, sophisticated collecting equipment has been necessary because of the substantial proportion of dust formed in the grinding process.

Solution and precipitation procedures for forming powders have been costly because of time involved in dissolving the resin and the precipitation which is usually effected by adding to the resin solution an organic liquid miscible with the solvent but incapable of dissolving the resin. This procedure thus involves not only solvent recovery and separation of mixed organic liquids, but also the drying of the precipitated resin with the problems of avoiding escape of organic liquid material. It has been proposed to form resin latices and produce powder by coagulation of the latices; but this process is limited in the character of material to which it is applicable.

Also, it is known that polyurethane can be prepared by the interfacial polymerization of polyisocyanates with compounds containing hydroxyl groups when the reaction is conducted in an inert liquid medium where one of the reactants is insoluble in the medium and the other may be soluble or insoluble. However, efforts to make very fine particles of a uniform size below 100 microns have not been successful.

BRIEF SUMMARY OF THE INVENTION

It is an object of the present invention to manufacture a very fine resin powder directly, that is, without grinding and without the use of a solvent for the resinous material.

BRIEF STATEMENT OF THE INVENTION

To this end in accordance with a feature of the present invention liquid materials reactive to form solid polyurethane resins are introduced into an organic liquid medium which is inert to the reactive materials and in which the reactive materials and the solid polyurethane are insoluble. The insoluble reactive materials are emulsified as fine droplets with the aid of special surfactants and react with the other reactive material present in the organic liquid medium to form finely divided particles of polyurethane. The particles of reaction product are insoluble in and will separate from the liquid medium.

DETAILED DESCRIPTION OF THE INVENTION

Polyurethane is made directly in very finely divided form by reaction between a first and second reactant in an organic liquid medium inert to the reactants. The reactants are insoluble in the organic liquid medium and are emulsified as fine droplets in a continuous phase of the liquid medium with the aid of special surfactants. The new product from chemical combination and polymerization of the reactants remains in dispersed form as solid particles insoluble in the organic liquid vehicle and may be separated as powder. Reaction to form solid polyurethane starts at the surface of the droplets and progresses inwardly toward the less accessible center portions of the droplets. Because of this there may be a difference between the —NCO to active hydrogen ratio at the surfaces and the ratio at the centers of the droplets and also a difference between molecular weight of the polyurethane at the surfaces and at the centers of the droplets.

These differences appear to be small where the droplets are extremely fine. Fine uniform polyurethane is obtained where the droplets are of the order of up to 200 microns in diameter and polyurethane useful for many purposes is obtainable where the droplets are as large as 500 microns.

Forming a uniform emulsion of the insoluble reactant as fine droplets of the required size with sufficient stability imposes special requirements on the surfactant in addition to chemical inertness in the reaction batch and exacting polarity requirements. Intensive agitation is needed to subdivide the reactant to the required extent and as the droplets react, they become more viscous and tacky with a tendency to deposit such as the agitator blades and walls of the vessel in which the emulsion is formed. In addition to impeding deposition of the material on surfaces, the surfactant must also meet the conflicting requirements of letting the solidified polyurethane settle out when reaction has solidified the droplets as fine particles and yet keeping the particles from clumping together after settling.

The reaction mixture may be formed by introducing the two reactants into the organic liquid medium separately at the same time under conditions which emulsify the insoluble reactants in the liquid medium, or be separately emulsifying the insoluble reactants in proportions of organic liquid medium and adding the emulsion to a body of organic liquid medium or by emulsifying one of the insoluble reactants in the organic liquid medium and emulsifying a second insoluble reactant in the emulsion.

Since both of the reactants are insoluble in the reaction medium, both must be dispersed. Where both reactants are insoluble, reaction occurs between dispersed —NCO containing reactant and dispersed active hydrogen containing reactants. The mechanism of this is not entirely clear; but the surfactant requirement noted above of impeding deposition on surfaces of the agitator and emulsion vessel, and of both allowing settling of particles and prevention of clumping remain.

The method of the present invention has been found particularly useful in the manufacture of polyurethane powder by reacting at least one organic compound of which at least two groups per molecule contain active hydrogen atoms which are reactive with —NCO groups, and at least one organic compound having at least two —NCO groups per molecule.

Organic liquids for use as the continuous phase of the emulsion may be any liquid not reactive with the reactants, e.g., not reactive with —NCO or with active hydrogen where the product is to be a polyurethane, and in which the reactants and the reaction product are insoluble. It is ordinarily desired that such liquids be volatile for removal from the reaction product by evaporation at temperatures which will not harm the product; and that the boiling point be above the desired reaction temperature. Liquids with lower boiling points may be used but may require the use of pressure vessels to allow operation at the desired temperature. Liquids which are high boiling or otherwise difficult to separate from the reaction product may be removed by washing or removing by solvent extraction with liquids which do not harm the reaction product and which are more readily removed. Organic liquids having a boiling point or boiling range, preferably between about 65° C. and about 200° C. such as hydrocarbons, halogenated hydrocarbons, and ethers may be used. Hydrocarbon liquids, preferably aliphatic hydrocarbon liquids, such as petroleum fractions, have been found desirable because of their low cost, inertness to the reactants and ease and completeness of removal from the reaction product.

Any organic compound or mixture of compounds having at least two —NCO groups and which is insoluble in the inert liquid of the continuous phase may be used in the method to form polyurethanes. —NCO terminated products, i.e., prepolymers for reacting a stoichiometric excess of one or more monomeric polyisocyanates with one or more organic compounds having at least two groups containing active hydrogen atoms may be used. For reaction to form such prepolymers, the monomeric polyisocyanates adapted for use include cyclohexylene-1,4-diisocyanate, 2,4-tolylene diisocyanate, 2,6-tolylene diisocyanate, 4,4′-diphenylmethane diisocyanate, 3,3′-dimethyldiphenylmethane-4,4′-diisocyanate and 4,4′-dicyclohexylmethane diisocyanate, p-phenylene diisocyanate, m-phenylene diisocyanate, xylylene diisocyanate, 1,4-naphthylene diisocyanate, diphenyl-4,4′-diisocyanate and hexamethylene diisocyanate. Organic compounds having at least two groups containing active hydrogen atoms useful to form these —NCO terminated reaction products include hydroxyl terminated polyesters from reaction and polymerization of organic compounds having at least two hydroxyl groups such as glycol, hexanediol, bis-(hydroxy methyl) cyclohexane, 1,4-butanediol, diethylene glycol and mixtures of these and organic compounds having at least two carboxyl groups such as adipic acid, succinic acid, sebacic acid, azelaic acid and mixtures of these, polyesteramides, polyhydric polyalkylene ethers, polyhydric polythioethers, polypropylene glycol, polybutylene glycol, polyalkylene ether glycols from condensation of an alkylene oxide such as ethylene oxide, propylene oxide and butylene oxide with a compound containing active hydrogens such as water, ethylene glycol and propylene glycol, polytetramethylene ether glycols and mixtures of these.

Any organic compound or mixture of compounds having at least two groups per molecule containing active hydrogens, and which is insoluble in the inert liquids and the continuous phase may be employed as a reactant for reaction with —NCO terminated prepolymers. For reaction with prepolymers, it is preferred that the compounds containing active hydrogens and which in this form of the method may be regarded as chain extenders, have molecular weights of from about 60 to about 300. Suitable compounds include 1,4-butanediol, 1,5-pentanediol, 1,6-hexanediol, diethylene glycol, p-phenylenedi-beta-hydroxy-ethyl ether, trimethylol propane, glycerol, alkanolamines such as diethanolamine, diamines, such as ethylene diamine, hexamethylene diamine and 4,4′-diaminodiphenyl methane.

The compound of compounds having reactive —NCO groups and the compound or compounds having groups containing active hydrogens are employed in relative proportions giving a molar ratio of active hydrogen to —NCO in the range of from about 0.85:1 to about 1.15:1. Where a thermoplastic resin is desired, the ratio should be from about 0.95:1 to about 1:05:1.

Use of a surfactant effective to aid in forming and maintaining an emulsion of very fine droplets of the immiscible reactants is of primary importance in the operation of the method to form very fine powders. Although little has been published on the preparation of nonaqueous emulsions, many of the principles which have evolved in the study of aqueous emulsions are valid. It has long been recognized that the suitability of emulsifying agents can be determined at least partly on the basis of their so-called hydrophile-lipophile balance numbers (HLB). Becher ("Emulsions, Theory and Practice", 2nd edition, page 233, Reinhold Publishing Corporation, New York) states that surfactants suitable for making water-in-oil emulsions are generally in the HLB range 3 to 6, while those suitable for making oil-in-water emulsions are generally in the HLB range 8 to 18. The well-known rule of Bancroft states that the external phase of an emulsion will be that in which the emulsifying agent is the more soluble. The factor of balance is important because if the disparity in solubility is too great — if the solubility is very high in one phase and very low in the other — no emulsion at all will be formed.

This concept of balance is further reinforced by the studies of J. H. Schulman and J. Leja (Transactions of the Faraday Society, Volume 50, page 598, 1954) who showed that solid powders could stabilize oil-in-water emulsions if the contact angle across the water phase at the solid-oil-water interface were slightly smaller than 90°. If the contact angle were slightly greater than 90°, water-in-oil emulsions were formed. If the particles were completely wetted by either the oil or the water, no stable emulsions were formed.

The necessity of balance in nonaqueous systems is illustrated by the fact that stable dispersion of organic solids in organic liquids can be made using copolymers as surface active stabilizers. (Br. Pat. to Osmond No. 1,052,241, published Dec. 21, 1966). In such cases, one part of the copolymer is solvated by the organic liquid and the other part becomes associated with the dispersed solid. The patent teaches that, for use in the patented process, the copolymer must have a substantial molecular weight to be effective, suitably at least 7,000.

Building on the principles discussed above, I have found that an emulsion of fine droplets of an insoluble liquid reactant for the production of finely divided polyurethane particles can be prepared using a polymeric surfactant one part of which is solvated by the inert liquid reaction medium and the other part of which is associated with the reactant droplets. For example, in order to emulsify 1,4-butanediol in heptane, one might choose as surfactant a copolymer made from two types of monomer (a) one like vinyl pyrollidone, vinyl alcohol, acrylamide, etc., which, if homopolymerized, would be highly compatible with 1,4-butanediol (b) one like vinyl stearate, lauryl methacrylate, long chain alpha-olefin, etc., which, if homopolymerized, would be highly compatible with heptane. Furthermore, the molecular weight of the copolymer and the mole ratio of its monomeric constituents would be such that it would be somewhat more solvated by the heptane than by the 1,4-butanediol so that the heptane would be the external phase.

Not only is the molar ratio of polar to non-polar monomers important, but also the distribution of monomers in the copolymer, that is, whether the copolymer has a linear, graft or block structure. If the polar monomer contains a group such as nitrile, tertiary amine, lactam, etc., which can form strong dipole interactions with polar groups in the reactants or reaction product, a linear copolymer structure will often be adequate. However, if the polar monomer contains groups such as esters which will form only weak interactions with ester or ether groups in the reactants, then a graft or block structure is usually necessary so that by a multiplicity of such weak bonds, an adequate association can be brought about between the surfactant and the internal phase of the reaction mixture.

Since amphipathic copolymer surfactants having the structure described herein have been shown in the present invention to be useful for producing polyurethanes in powdered form, it is to be expected that homopolymers composed of amphipathic monomers would also be useful for the same purposes. N-vinyl-3-octadecyl pyrrolidone, N-vinyl-5-dodecyl-3-morpholinone, 1-hexadecyl-acrylonitrile, N,N-dioctylaminoethylmethacrylate, etc., are examples of such monomers.

There must be some specificity to the surfactant according to the nature of the insoluble reactant chosen to produce the polyurethane. For example, in order to emulsify polytetramethylene ether glycol in heptane, one would require a surfactant with a polarity balance different from that required to emulsify hydroxyl terminated polybutylene adipate; since the former is less polar than the latter, the mole ratio of the polar moiety of the required surfactant would be less.

However, the requirement for specificity does not demand the synthesis of a new surfactant for each case. It is well known that in emulsifying oils of various HLB requirements in water one can product such emulsions with blends of various compositions of just two surfactants, one polar and the other less-polar. For example, using Span 20 with an HLB of 8.6 and Tween 20 with an HLB of 16.7, one can make blends of these surfactants that will product oil-in-water emulsions of both mineral oil with an HLB requirement of 10 and benzene with an HLB requirement of 15.

A parallel situation exists in making emulsions of one organic liquid in another organic liquid. For example, using two copolymers of vinyl pyrrolidone and hexadecene-1, one containing 0.56:1 mole ratio of vinyl pyrrolidone to hexadecene-1 and the other 2.22:1 mole ratio, one can emulsify in heptane, hydroxy terminated polyethers or polyesters of different polarity by making blends of the copolymers having a polarity balance appropriate for the reactant to be emulsified.

P. A. Small (Journal of Applied Chemistry, Volume 3, page 71, 1953) has published a table of "molar-attraction constants" from which the solubility parameter of a polymer may be calculated when the structural formula, the density and the molecular weight are known. Specific numerical values are assigned to the ester, ether, aromatic groups and so on. From these values it can be calculated that the solubility parameter of polytetramethylene ether glycol, molecular weight 1,000, is about 8.5, whereas the solubility parameter of a polyurethane made from one equivalent of this polyether glycol, one equivalent of 1,4-butanediol and two equivalents of diphenylmethane diisocyanate is about 10.5. Thus, there is an appreciable increase in polarity when the polyether is converted to a polyurethane. Based on these considerations, one would not expect the ideal surfactant for emulsifying the polyether to be ideal surfactant for preventing agglomeration of the polyurethane product. Indeed, it would appear desirable for the action of the surfactant to be somewhat less than ideal, so that the particles of product will be large enough to settle rather than become a fine, stable dispersion which would render difficult the removal of the product from the reaction medium.

The molecular weight of the surfactant must be at least 2,000, preferably above 7,000, in order to provide a steric barrier of sufficient thickness to minimize coalescence of the liquid droplets of reactant and to prevent agglomeration of the solid particles of reaction product. The higher the molecular weight of the solvated portion of the surfactant molecule, the greater is the number of possible chain configurations it can assume. As two droplets of emulsion, or two particles of product, approach one another there is a reduction in available volume, an increase of interaction between the solvated chains associated with one particle and those associated with the other particle and a corresponding reduction in the number of possible chain configurations. This loss in configurational entropy provides the necessary repulsive force between droplets and between particles.

For emulsifying the insoluble liquid reactants in the present method and for preventing agglomeration of the reaction product, the products of copolymerizing vinyl pyrrolidone with an alkylated olefin to give copolymers with molecular weight of at least 7,000 have been found to be particularly effective surfactants. The nature and quantity of surfactant used will depend on a variety of factors including the physical properties of the reactants and of the inert liquid medium, the efficiency of the emulsifying equipment, the size of reaction product particle desired and so on. In general, from about 0.1% to about 10% of surfactant based on the weight of the emulsified reactant will be used.

In order to provide that at least about 95% by weight of the reaction product particles are in the range of 1 to 300 microns in diameter, that is, that they will be fine and yet settle readily, the quantity and effectiveness of the surfactant must be coordinated with the degree of agitation of the reaction mixture. The higher the molecular weight and the more suitable the balance of polar and less-polar groups in the surfactant with respect to the polarity of the emulsified reactant and of the reaction product, the less surfactant will be needed to produce the desired particle size when a given amount of agitation is used. Conversely, intense agitation can, to some extent, overcome deficiencies in the quality of the surfactant.

Catalysts are ordinarily employed to improve the rate and completeness of reaction. Any of a variety of known catalysts can be used including dibutyl tin dilaurate, stannous octoate, tertiary amines such as N-methylmorpholine and triethylamine, mercury catalysts such as phenyl mercuric propionate, lead naphthenate, lead octoate and others. Very small amounts, only sufficient to provide catalytic action, are used and it is preferred that the amount be from about 0.01% to about 1% by weight based on the emulsified reactants.

Any of the well-known emulsating equipment can be used to disperse the reactive materials. Thus, high speed agitating devices as well as homogenizers in which an emulsion is formed by forcing the materials through narrow openings, have been found effective. These devices are used in accordance with procedures known to those skilled in the art. The relative weight of reactants to the weight of the inert liquid medium does not appear to be critical and emulsions have been made with as much as about 60% by weigth of the reactive materials based on the weight of the final reaction mixture and it is preferred to use at least about 25% by weight of reactants.

In emulsifying liquid reactants it is preferred to operate under conditions giving a droplet size of from 1 to 300 microns, most preferably from 5 to 75 microns. The droplet size is controlled by the severity of agitating or homogenizing action and by the effectiveness of the surface active agent.

The time required for reaction to form solid polyurethane varies with the temperature, the efficiency of the catalyst and the reactivity of the components of the droplets. Reaction times may be from as little as 15 seconds for aliphatic amine - aromatic —NCO reaction to as much as 2 hours for hydroxyl-aliphatic—NCO.

Carrying out the reaction through dispersion of reactive materials in an inert solvent offers a number of advantages in addition to that of forming fine particle size reaction product directly. That is, good temperature control is achieved since the reaction takes place in a well-agitated liquid and in addition the relative proportions of the reactants are more uniform throughout the reaction system because of the dispersion of the reactive materials so that localized excessive concentrations of one or the other reactive materials are avoided.

Because of the fine, uniform, solidified condition of the reaction product, it is readily separated from the inert liquid medium by such known procedures as filtration, centrifugation and decantation. Conventional equipment for performing these operations may be used.

After separation of the finely divided reaction product, the product is normally washed with an inert organic liquid. This washing may be needed to remove the inert liquid forming the continuous phase of the reaction emulsion where the reaction liquid is relatively non-volatile or otherwise difficult to remove. However, in any case, it is desirable to wash the reaction product in order to remove surfactant which may remain in the product after separation from the continuous phase.

Following the washing step, the reaction product is dried. It has been found useful with some reaction products to incorporate a finely divided solid material such as talc, silica or pigment to reduce a possible tendency of the particles to become agglomerated. This solid material may be introduced at any convenient stage either before separation of the finely divided reaction product from the inert liquid continuous phase or by suspending the reactive particles in a wash liquid along with the finely divided inorganic material or by admixture or stirring into the fine particles of reaction product either before or after drying.

Drying of the particles of reaction product may be effected in any suitable manner such as on trays or drying screens or by procedure comparable to fluid bed drying in which a slurry of the fine particles of reaction product is suspended in contact with a warm or hot gas. In a drying operation comparable to fluid bed drying, a dusting material to prevent agglomeration of the particles may be included in the gaseous medium for drying the finely divided product.

The following examples are given to aid in understanding the invention but it is to be understood that the invention is not limited to the particular materials, temperatures, procedures and other conditions set forth in the examples.

EXAMPLE 1

96.7 gm. of a prepolymer (prepared by reacting 2 equivalents of 4,4'-diphenylmethane diisocyanate with one equivalent of hydroxyl terminated polybutylene adipate, mol. wt. 1,000, for 3 hours at 80° C.) was emulsified in 150 gm. of a surfactant consisting of a copolymer of vinyl pyrrolidone and hexadecene-1 in the mole ratio of 1.72 to 1 and having an average molecular weight of 8,000. Thus, the molecules contained an average of about 36 polar pyrrolidone groups and 21 non-polar hexadecyl side chains. While this emulsion was being stirred at 65° C. there was added 0.1 gm. of dibutyl tin dilaurate and 5.8 gm. of 1,4-butanediol. After ¾ hour stirring, the reaction formed fine particles dispersed in the liquid hydrocarbon. The particles settled out readily and over 95% by weight would settle out in a sample held overnight. The reaction batch was filtered and the particulate product rinsed with hexane and air dried. A film prepared from this product on a hydraulic press with platens at 150° C. and pressure of 60 p.s.i. had the following tensile properties:

| | |
|---|---|
| 100% modulus | 1,000 p.s.i. |
| Tensile strength | 10,000 p.s.i. |
| Elongation | 625% |

EXAMPLE 2

30.1 gm. of a prepolymer (prepared by reacting 2 equivalents of an isomeric mixture of 80% 2,4- and 20% 2,6-tolylene diisocyanate with 1 equivalent of polytetramethylene ether glycol, mol. wt. 1,000, for 3 hours at 80° C.) was emulsified in 75 gm. of the hydrocarbon liquid of Example 1 containing 1.1 gm. of a surfactant consisting of a copolymer of vinyl pyrrolidone and hexadecene-1 in the mole ratio of 0.56 to 1, and having an average mol. wt. of 7,300. Thus, the molecules contained an average of about 14 polar pyrrolidone groups and 26 non-polar hexadecyl side chains. While this emulsion was being stirred at room temperature, there was added a dispersion of 2.23 gm. of 2-methyl piperazine in the same liquid hydrocarbon. (This dispersion was prepared by dissolving the 2.32 gm. of 2-methyl piperazine in 4.46 gm. of methylene chloride and then adding to this solution 19 gm. of the paraffinic hydrocarbon to form a precipitate). After ¾ hour stirring, the mixture was filtered and the particulate product rinsed with hexane and air dried. A film prepared from this product on a press with platens 175° C. and a pressure of 60 p.s.i. had the following tensile properties:

| | |
|---|---|
| 100% modulus | 660 p.s.i. |
| Tensile strength | 3,500 p.s.i. |
| Elongation | 530% |

EXAMPLE 3

628 gm. of molten hydroxyl terminated polybutylene adipate, mol. wt. 1,000, was added slowly with stirring to 314 gm. of molten 4,4'-diphenylmethane diisocyanate. When the addition was complete, 1 gm. of dibutyl tin dilaurate was added causing an immediate rise in viscosity. About ½ hour later 30 gm. of sodium dioctyl sulfosuccinate dissolved in 30 gm. of liquid paraffinic hydrocarbon was added, followed by a solution of 28 gm. of the surfactant used in Example 1 dissolved in 1400 gm. of heptane. An emulsion was formed with prepolymer as the internal phase. While this was being stirred at 74° C., 59.2 gm. of 1,4-butanediol was added. After ¾ hour stirring, the reaction mixture was filtered and the particulate product was rinsed with hexane and air dried. A film prepared from this product on a hydraulic press with platens at 160° C. and pressure of 60 p.s.i. had the following tensile properties:

| | |
|---|---|
| 100% modulus | 1,100 p.s.i. |
| Tensile strength | 7,500 p.s.i. |
| Elongation | 735% |

EXAMPLE 4

To a 47° C. mixture of 62.5 gm. of 4,4'-diphenylmethane diisocyanate, 5.6 gm. of the surfactant used in Example 2 and 293 gm. of the hydrocarbon liquid of Example 1 there was added slowly with stirring 126.2 gm. of polytetramethylene ether glycol, mol. wt. 1,000. When the addition was complete 0.2 gm. of dibutyl tin dilaurate was added. Five minutes later 11.32 gm. of 1,4-butanediol was added to the 60° C. prepolymer emulsion. After ¾ hour stirring, the reaction mixture was filtered and the particulate product rinsed with hexane and air dried. A film prepared from this product on a hydraulic press with platens at 160° C. and pressure of 60 p.s.i. had the following tensile properties:

| | |
|---|---|
| 100% modulus | 700 p.s.i. |
| Tensile strength | 6,300 p.s.i. |
| Elongation | 885% |

Having thus described my invention, what I claim as new and desire to secure by Letters Patent of the United States is:

1. The method for preparing polyurethane resins directly in finely divided form from reaction of a first liquid reactant comprising at least one organic polyisocyanate with a second liquid reactant comprising at least one organic compound containing at least two groups having active hydrogen to form a solid reaction product, said first reactant being employed in amount relative to the amount of said second reactant to give a molar ratio of active hydrogen to —NCO in the range of from about 0.85:1 to about 1.5:1, said method comprising emulsifying said reactants with the aid of an organic polymeric surfactant as fine droplets of said first reactant and fine droplets of said second reactant in a continuous phase comprising an organic liquid inert to and less polar than said reactants an in which said reactants and said solid reaction product are substantially insoluble, said surfactant being present in amount of from about 0.1% to about 10% on the weight of emulsified insoluble liquid reactants, reacting said emulsified reactants by reaction between the droplets of said first reactant and droplets of said second reactant emulsified in said inert organic liquid under conditions of vigorous agitation to form fine particles of said polyurethane separable from said inert liquid by settling, and separating said particles from said inert liquid, the molecules of said polymeric surfactant having an average molecular weight of at least about 2,000, and having polar groups which associate with the surface of said droplets of emulsified insoluble reactants and with particles of said solid reaction product and less-polar groups which are solvated by the said inert organic liquid, the quantity and the balance of polar to less-polar groups of said surfactant relative to the polarities of said inert organic liquid, said insoluble emulsified reactants and said reaction product providing that the total association of less polar groups with said inert organic liquid is greater than the total association of the polar groups with said emulsified insoluble reactants and with said solid reaction product by an amount to ensure that said inert liquid will be the external phase, but is less than the amount which would interfere with formation of a fine emulsion of the insoluble liquid reactants in said inert organic liquid, coordinating (a) the intensity of said agitation; (b) the quantity and the balance of polar to less-polar groups of said surfactant in said emulsion and (c) the polarities of said inert liquid organic liquid, said emulsified insoluble liquid reactants and said reaction product to form a fine emulsion in which at least about 95% by weight of the droplets of said emulsified liquid reactants will be in the range of from 1 to 300 microns in diameter so that the particles of reaction product will settle, the association of said surfactant with said reaction product holding said surfactant on the surface of said particles of reaction product to impede agglomeration of said particles.

2. The method for preparing polyurethane resins directly in finely divided form as defined in claim 1 in which said surfactant is a copolymer of two types of monomer of which one, if homopolymerized, would have a polarity compatible with the emulsified reactants and the other, if homopolymerized, would have a lower polarity compatible with the inert organic liquid.

3. The method for preparing polyurethane resins directly in finely divided form as defined in claim 2 in which the intensity of agitation, the quantity and balance of polar to less-polar groups of said surfactant and the polarities of said insoluble reactants and said reaction product are coordinated to provide that at least about 95% by weight of the particles of reaction product are in the range of from about 5 to about 75 microns in diameter.

4. The method for preparing polyurethane resins directly in finely divided form as defined in claim 3 in which said inert organic liquid is an aliphatic hydrocarbon having a boiling range between about 65° C. and about 200° C. and in which said surfactant comprises at least one polyvinyl pyrrolidone having alkyl side chains from copolymerization of alkylated olefins and vinyl pyrrolidone said alkyl chains having from 4 to 20 carbon atoms and the proportion of alkylated olefins of said copolymer being in the range of from about 10% to about 80%.

5. The method for preparing polyurethane resins directly in finely divided form as defined in claim 4 in which said reactant comprising at least one organic polyisocyanate is an —NCO terminated prepolymer and in which said reactant containing at least two groups having active hydrogen includes a chain extender having a molecular weight of from about 60 to about 300.

6. The method for manufacturing finely divided polyurethane resin as defined in claim 5 in which one of said reactants is a solid and the other of said reactants is a liquid at the temperature of said inert organic liquid medium.

7. The method for manufacturing finely divided polyurethane resin as defined in claim 4 in which one of said reactants for reaction to form a polyurethane is introduced and finely dispersed into a dispersion of the other said reactant in said inert organic liquid medium.

8. The method for manufacturing finely divided polyurethane resin as defined in claim 5 in which both of said reactants are liquid at the temperature of said inert organic liquid medium.

9. The method for manufacturing finely divided polyurethane resin as defined in claim 4 in which said reactant having at least two active —NCO groups is finely dispersed in a first body of inert organic liquid medium, said reactant having at least two groups with reactive hydrogen atoms is dispersed in a second body of inert organic liquid medium and said bodies of inert organic liquid containing said dispersed reactants are combined and mixed for reaction between the dispersed reactants.

* * * * *

UNITED STATES PATENT OFFICE
CERTIFICATE OF CORRECTION

Patent No. 4,032,516  Dated June 28, 1977

Inventor(s) John J. McGarr

It is certified that error appears in the above-identified patent and that said Letters Patent are hereby corrected as shown below:

Column 12, claim 9, line 8, after the word "liquid" insert -- medium --.

Signed and Sealed this

Thirteenth Day of September 1977

[SEAL]

Attest:

RUTH C. MASON  
*Attesting Officer*

LUTRELLE F. PARKER  
*Acting Commissioner of Patents and Trademarks*